(12) United States Patent
Porter

(10) Patent No.: US 7,099,462 B2
(45) Date of Patent: Aug. 29, 2006

(54) SILENT RINGING WITH REDUCED DEVICE SIZES

(75) Inventor: Steven Porter, Nepean (CA)

(73) Assignee: Ciena Corporation, Linthicum, MD (US)

( * ) Notice: Subject to any disclaimer, the term of this patent is extended or adjusted under 35 U.S.C. 154(b) by 317 days.

(21) Appl. No.: 10/713,574

(22) Filed: Nov. 12, 2003

(65) Prior Publication Data

US 2004/0149551 A1    Aug. 5, 2004

(30) Foreign Application Priority Data

Nov. 12, 2002    (CA)    .................................. 2411622

(51) Int. Cl.
*H04M 19/00*    (2006.01)

(52) U.S. Cl. .................................. 379/413.01; 379/382

(58) Field of Classification Search .......... 379/413.01, 379/251–255, 324, 382; 307/70, 72–75, 307/64, 85–87; 330/96, 127, 134

See application file for complete search history.

(56) References Cited

U.S. PATENT DOCUMENTS

| | | | |
|---|---|---|---|
| 3,941,939 A * | 3/1976 | Holmes et al. | ............. 379/382 |
| 4,166,930 A * | 9/1979 | Rovnyak | .................... 379/382 |
| 4,224,476 A | 9/1980 | Tuhy, Jr. et al. | |
| 4,955,053 A | 9/1990 | Siegmund | |
| 5,406,623 A | 4/1995 | Rovik | |
| 6,078,593 A | 6/2000 | Eames et al. | |
| 6,233,335 B1 | 5/2001 | Ludeman | |
| 6,456,712 B1 | 9/2002 | Hein et al. | |
| 6,510,204 B1 | 1/2003 | De Clercq et al. | |
| 2003/0118157 A1 | 6/2003 | McGinn | |

OTHER PUBLICATIONS

International Search Report for PCT/US03/36374.

\* cited by examiner

*Primary Examiner*—Daniel Swerdlow
(74) *Attorney, Agent, or Firm*—Merek, Blackmon & Voorhees, LLC

(57) ABSTRACT

A system and a method selectively switch between two different voltage supplies supplying a common node. A first of the voltage supplies is coupled to the common node by a first switch and a second of the voltage supplies is coupled to the common node by a second switch. The switching device comprises: a feedback network comprising a high-pass filter for filtering a signal at the common node and outputting the filtered signal as a feedback signal; a timing controller coupled to at least one of the first and second voltages supplies for determining when to switch between said first and second power supplies; a ring switch controller for applying a first control signal to the first switch for selectively enabling and disabling the first switch in response to the timing controller and the feedback signal; and a battery switch controller for applying a second control signal to the second switch for selective enabling and disabling the second switch in response to the timing controller and the feedback signal. The method comprises the steps of: receiving a request to switch between the first and second voltage supplies; gradually removing the voltage supply coupled to the common node; gradually applying the other of said voltage supplies; and filtering a signal at said common node for detecting noise.

20 Claims, 4 Drawing Sheets

SILENT RINGING WITH REDUCED DEVICE SIZES

CROSS-REFERENCE TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to the field of ringing controllers, and specifically to ringing controllers for providing switching between battery feed and ringing states.

With increased demand to deliver high-speed data services to subscribers, many techniques have been developed to utilize existing telephone loops to carry data signals simultaneously with normal voice band telephony services. Generally, data signals are carried in a frequency range, referred to as a data band, that is above the voice band. However, signals associated with plain ordinary telephone service (POTS), such as on-hook and off-hook transitions and ringing, generate high noise levels at frequencies above the voice band and, thus, this noise falls in the data band causing interference. Traditionally, large and costly filters, often referred to as "POTS Splitters", have been employed at the telephone equipment location to remove POTS-created noise from the data band. This requirement has been an impediment to the large-scale deployment of data services.

The generally accepted method of alerting a subscriber that an incoming telephone call has arrived is to apply a high magnitude AC waveform to the subscriber loop in order to ring a bell or similar audible alerting device at the subscriber's premises. One very common standard in North America is to use 86 V rms alternating current signals with a frequency of 20 Hz, although other different voltages and frequencies can be employed. This AC waveform is often referred to as the power-ringing signal.

The process of ringing a subscriber's line can be considered as a transition between two states. A first state is providing a battery feed to the loop, which may include on-hook transmission or supervision, and when the subscriber is off-hook and connected to another subscriber. Second, the state of providing the power-ringing signal to the loop to alert the subscriber that another subscriber is calling.

Data transmission in the data band is provided over the subscriber line at all times during these two states, and during transitions between these two states. However, data signals require very good signal to noise ratios to achieve the high throughputs required by applicable industry standards and are quite susceptible to noise, both in the time and frequency domains. Thus, it is desirable that transitions between the battery feed and power-ringing states cause a minimum amount of noise in the data band.

Traditionally, mechanical relays have been employed to switch power-ringing signals onto the subscriber loop. It is an unfortunate characteristic of relays that they tend to introduce discontinuities onto the loop voltage due to timing variations, abrupt switching behavior, contact bounce, or open-circuit intervals between states. Large voltage discontinuities manifest themselves as high frequency noise, which interfere with data signals. Thus, it is desirable that the change between the battery feed state and the ringing state be continuous and smooth to avoid creating noise artefacts that interfere with transmission in the data band.

More recently, solid-state relays have been employed to switch power-ringing signals. In a co-pending application, the need for a traditional POTS splitter filter is reduced by timing the removal and application of the battery state and the ringing states through monitoring the voltage zero crossing and applying feedback techniques. This approach makes the ringing transitions contribute little interference in the data band. Such an implementation is illustrated in FIG. 1. However, in order for this to operate properly, the switching process may begin prior to the next zero crossing of the power-ringing signal and battery supply, thus prediction and timing of this trigger event should be taken into account. This implies that adaptation for different ringing frequencies would need to be implemented, which may vary from country to country.

Further, the approach described with reference to FIG. 1 is implemented in a "make before break" manner. That is, the battery feed is applied to the subscriber line before the ring source is removed. The disconnection of the ring source from the subscriber line is timed precisely in a short interval, to within $\frac{1}{20}$th of the period of the ring source, from the voltage crossing of the ring source and the battery. However, any residual currents in the load, due to inductive elements, will flow into the battery. These currents can be quite large and require a large low impedance device to pass these currents between the battery and the load. Although large discrete devices are available, in certain applications a large device may be expensive in terms of silicon area, and may be difficult and expensive to integrate.

Therefore, it is an object of the present invention to obviate or mitigate at least some of the above-mentioned disadvantages.

SUMMARY OF THE INVENTION

In accordance with an aspect of the present invention, there is provided a switching device for selectively applying one of two different voltage supplies to a common node. A first of the voltage supplies is coupled to the common node by a first switch and a second of the voltage supplies is coupled to the common node by a second switch. The switching device comprises: a feedback network comprising a high-pass filter for filtering a signal at the common node and outputting the filtered signal as a feedback signal; a timing controller coupled to at least one of the first and second voltages supplies for determining when to switch between said first and second power supplies; a ring switch controller for applying a first control signal to the first switch for selectively enabling and disabling the first switch in response to the timing controller and the feedback signal; and a battery switch controller for applying a second control signal to the second switch for selective enabling and disabling the second switch in response to the timing controller and the feedback signal.

In accordance with another aspect of the present invention, there is provided a method for selectively switching between two different voltage supplies supplying a common node. A first of the voltage supplies is coupled to the common node by a first switch and a second of the voltage supplies is coupled to the common node by a second switch. The method comprises the steps of: receiving a request to switch between the first and second voltage supplies; gradually removing the voltage supply coupled to the common node; gradually applying the other of said voltage supplies; and filtering a signal at said common node for detecting noise.

BRIEF DESCRIPTION OF THE DRAWINGS

A preferred embodiment of the invention will now be described by way of example only with reference to the following drawings in which.

DETAILED DESCRIPTION OF THE INVENTION

Figure 1:
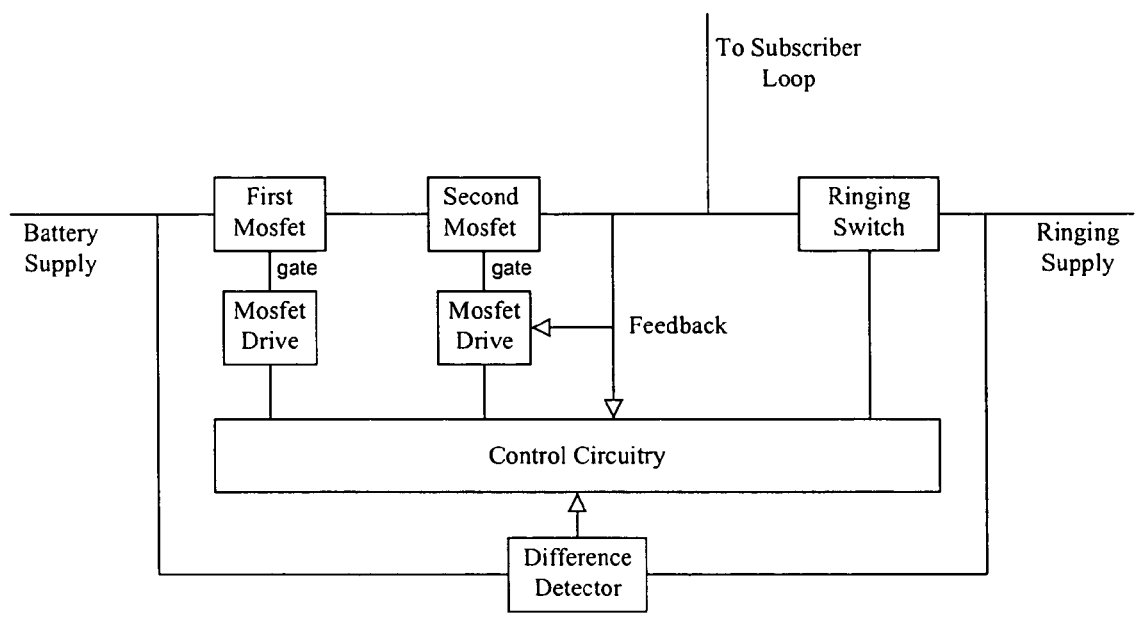
FIG. 1 is a schematic diagram of a ringing controller (prior art)

For convenience, like numerals in the description refer to like structures in the drawings.

Figure 2:
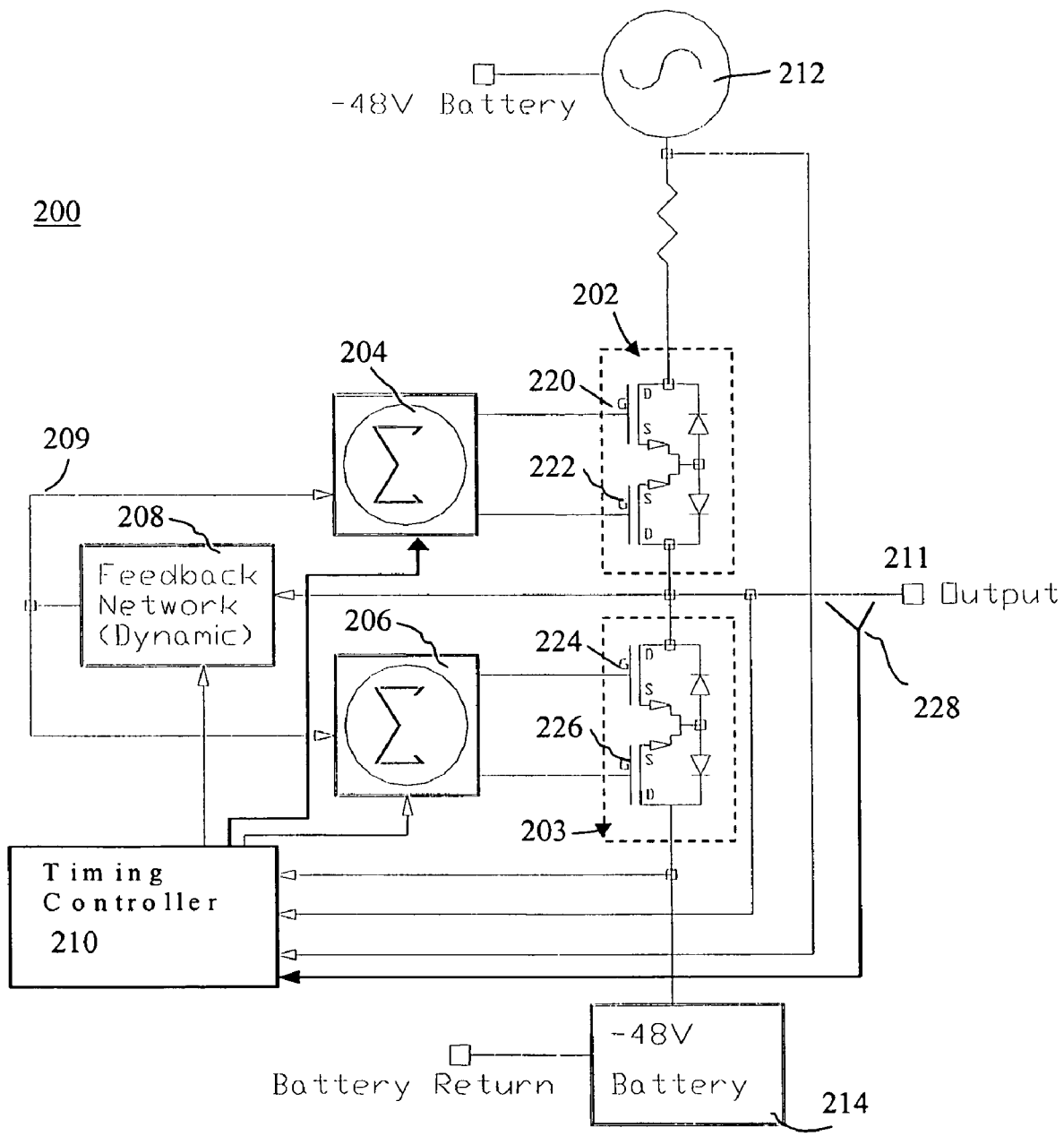
FIG. 2 is a schematic diagram of a ringing controller in accordance with an embodiment of the invention.

Referring to FIG. 2, a ring controller in accordance with an embodiment of the present invention is illustrated generally by numeral 200. The ring controller 200 includes a ring switch 202, a battery switch 203, a ring switch controller 204, a battery switch controller 206, a feedback network 208, and a timing controller 210. An output current sense 228 (optional) may be used in some applications.

The ring switch 202 is coupled between an output 211 of the ring controller 200 and a power-ringing supply 212. The battery switch 203 is coupled between the output 211 of the ring controller 200 and a battery supply 214. The ring switch controller 204 controls the operation of the ring switch 202. The battery switch controller 206 controls the operation of the battery switch 203. The feedback network 208 has an input coupled to the output 211 of the ring controller 200 and an output coupled to both the ring switch controller 204 and the battery switch controller 206. The timing controller 210 has inputs coupled to the output 211 of the ring controller 200, the power-ringing supply 212, the battery supply 214, and the output current sense 228. The timing controller 210 has outputs coupled to the battery switch controller 206, the ring switch controller 204, and the feedback network 208.

The application and removal of both the battery supply 214 and the power-ringing supply 212 are gradual, timed, and modified by the feedback network 208. In the present embodiment, the application of ringing is timed relative to a particular voltage of the power-ringing supply 212, as detected by the timing controller 210. The removal of ringing is timed relative to a particular voltage of the power-ringing supply 212, or timed to a particular output current, such as the zero current crossing, as detected by the timing controller.

In the present embodiment, the ring switch 202 comprises back-to-back Field Effect Transistors (FETs) 220 and 222, although other devices may be used as will be apparent to a person skilled in the art. Back-to-back FETs 220 and 222 are used and each transistor blocks one voltage polarity of the power-ringing signal. Thus, to block an alternating current (AC) waveform, two n-channel FETs 220 and 222 are used, one for each polarity. If the power-ringing signal voltage stays either always above or always below the ring controller output 211 voltage, then it is possible to use only one FET as will be appreciated by one skilled in the art. Each of the FETs 220 and 222 is driven by a low power control signal supplied by the ring switch controller 204. Thus, the power-ringing signal, which is 86 Vrms in the present embodiment, is effectively controlled by the low power control signal driving the ring switch 202. The control signal is adjusted to gradually increase or decrease the impedance of the ring switch 202.

The battery switch 203 may also be comprised of back-to-back FETs 224 and 226. Similarly to the ring switch 202, if the ring controller output 211 voltage always stays above the battery supply 214 voltage then it is possible to use only one FET. Each of the FETs 224 and 226 is driven by a low power control signal supplied by the battery switch controller 206. Thus, the battery signal is effectively controlled by the low power control signal driving the battery switch 203. The control signal is adjusted to gradually increase or decrease the impedance of the battery switch 203.

The feedback network 208 comprises a high pass filter. The high pass filter is designed to pass noise on the output that would fall in the data band frequencies and block the ring frequency, which allows the ring controller 200 to attenuate switching noise in the data band without attenuating the fundamental power-ringing signal. The feedback network 208 senses the output signal 211 and outputs a feedback signal, which is used to modify the control signals to both the ring switch 202 and the battery switch 203 to attenuate any high frequency signals that may interfere with the signals in the data band.

The timing controller 210 effectively monitors the voltages at the power-ringing supply 212, battery supply 214, and output 211. The timing controller 210 also, in some applications, monitors the output current through the output current sense 228. As will be described with reference to the operation of the ringing controller 200, the timing controller 210 receives a request to switch between states. The timing controller 210 signals to the ring switch controller 204 and battery switch controller 206 to begin to open or close their respective switches 202 and 204 as required.

The operation of the ringing controller 200 will now be described with reference to FIGS. 3 and 4. The operation can be implemented by a processor, software, digital hardware, analog hardware, a combination thereof, or by other means. An example application of the ring controller 200 is a line card, which combines POTS and data transmission over a subscriber loop, for minimizing the impact of the application and removal of the power-ringing signal on data signal transmission.

Figure 3:
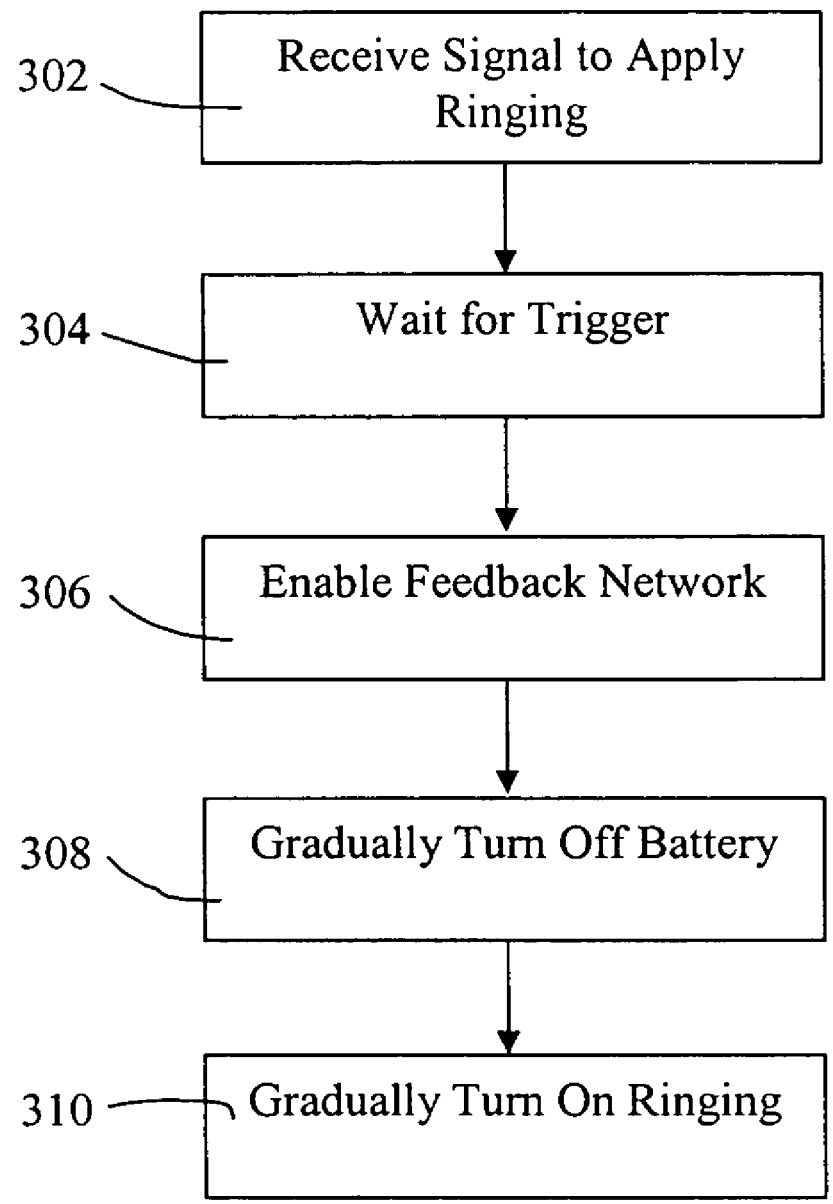
FIG. 3 is a flow chart of the operation of the present embodiment of the ringing controller while applying ringing.

Referring to FIG. 3, a flow chart illustrating the operation of the ringing controller while switching from the battery state to the ringing state is shown generally by numeral 300. In step 302, the ring controller 200 is instructed to invoke the change of connectivity to the output 211 from battery 210 to power-ringing supply 212. In step 304, the timing controller 210 waits for a predefined trigger event. In the present embodiment, the trigger event is defined as approximately the next voltage crossing of the power-ringing supply 212 and the battery supply 214.

In step 306, the timing controller 210 enables the feedback network 208. Thus, only signals higher than a predetermined frequency are fed back to the ring switch controller 204 and the battery switch controller 206. In step 308, the timing controller 210 causes the battery switch controller 206 to reduce the control signal such that the battery switch 203 effectively turns off. In the present embodiment, the time period is approximately ⅒th of a ring cycle. The timing controller 210 may wait until the connection of the battery voltage at the output 211 falls below a predefined threshold or until the battery supply 214 is completely cut off before proceeding with step 310.

In step 310, the timing controller 210 causes the ring switch controller 204 to gradually increase the control signal over a portion of a ring cycle to turn on the ring switch 202 and connect power-ringing supply 212 to the output 211. In the present embodiment, the time period is less than half a cycle of the power-ringing supply signal.

The feedback signal 209 is used by the ring switch controller 204 to modify the transition to the ringing state in such a way as to attenuate any frequency content that will interfere with data transmission. That is, the feedback signal 209 is indicative of noise in the data band. Thus, ideally the feedback signal 209 is zero. If the feedback signal 209 is greater than zero, then the ring switch controller 204 reduces the rate at which the ring switch 202 turns on. In turn, the feedback signal 209 is reduced. This continuous feedback to modify the ring switch control reduces the feedback signal 209 and hence the noise in the data band.

Figure 4:
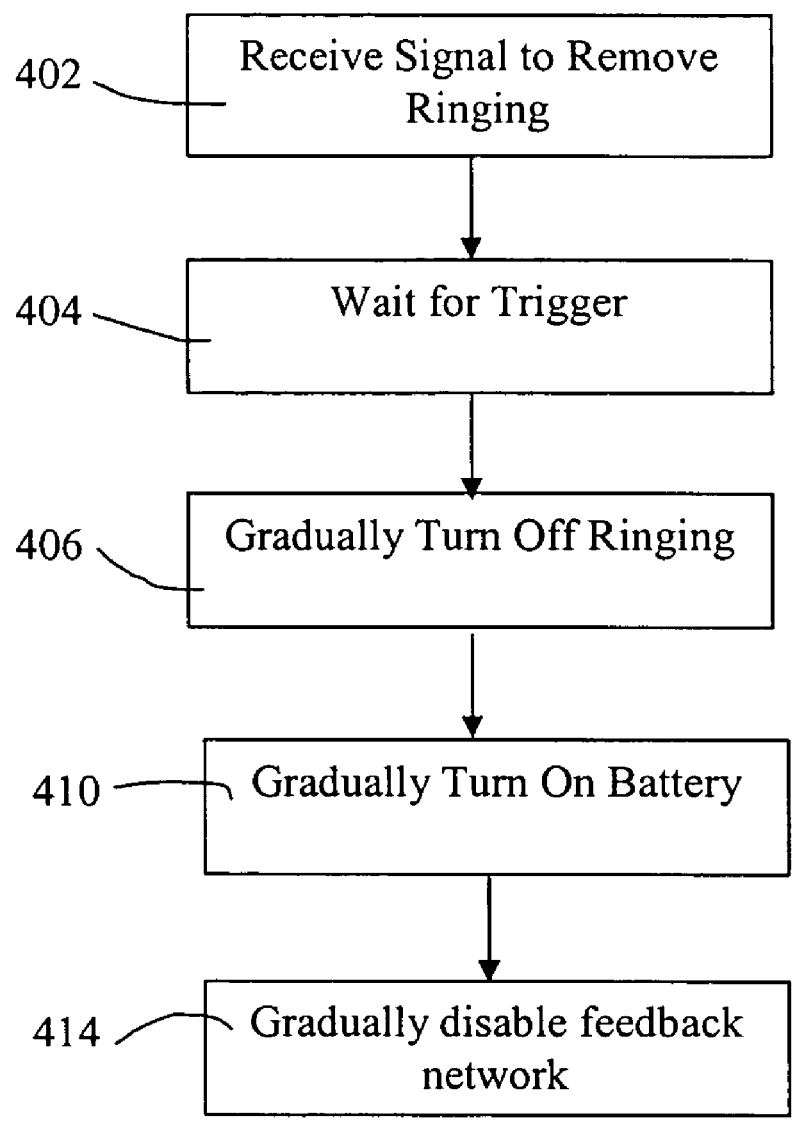
FIG. 4 is a flow chart of the operation of the present embodiment of the ringing controller while removing ringing.

Referring to FIG. 4, a flow chart illustrating the operation of the ringing controller while switching from the ringing state to the battery state is shown generally by numeral 400. In step 402, the timing controller 210 is instructed that a power-ringing signal is to be removed from the output 211 and the battery supply 214 is to be applied. In step 404, the timing controller 204 waits for a predefined trigger event. In the present embodiment, the trigger occurs when the output current crosses a predefined threshold of 0 mA. Alternatively, the trigger could occur at the next voltage crossing of the output 211 and the battery supply voltage 214.

In step 406, the timing controller 210 causes the ring switch controller 204 to gradually reduce the control signal, effectively turning off the ring switch 202, over a period of approximately one fifth of a ring cycle in the present embodiment. The feedback signal 209 is used by the ring switch controller 204 to modify the transition from ringing in such a way as to attenuate any frequency content that will interfere with data signals. That is, the feedback signal 209 is indicative of noise in the data band. Thus, ideally the feedback signal 209 is zero. If the feedback signal 209 is greater than zero, then the ring switch controller 204 reduces the rate at which the ring switch 202 turns off. In turn, the feedback signal 209 is reduced. The timing controller 210 may wait until the connection of ringing voltage at the output 211 falls below a predefined threshold or until the ringing supply 212 is completely cut off before proceeding to step 410.

In step 410, the timing controller 210 causes the battery switch controller 206 to gradually increase the control signal, effectively turning on the battery switch 203, over a period of approximately one fifth of a ring cycle. The feedback signal 209 is used by the battery switch controller 206 to modify the transition to battery in such a way as to attenuate any frequency content that will interfere with transmission in the data band. Thus, ideally the feedback signal 209 is zero. If the feedback signal 209 is greater than zero, then the battery switch controller 206 reduces the rate at which the battery switch 203 turns on. In turn, the feedback signal 209 is reduced.

In step 414, the timing controller 210 gradually disables the feedback network 208 over a period of approximately one fifth of a ring cycle. During this period, the voltages that have built up in the high-pass filter in the feedback network 208 are discharged.

In the present embodiment, the feedback network 208 is enabled just prior to applying the power-ringing signal and not disabled until the power-ringing signal is removed and the battery signal reapplied. Alternately, it may be advantageous to disable the feedback network 208 after each transition of connecting the output between battery and power-ringing supplies is complete. This would be advantageous, for example, for power reduction reasons. In such a case, the feedback network 208 would need to be enabled preceding a transition and disabled after a transition. According to another embodiment, leaving the feedback network 208 active whenever the battery 214 or power-ringing supply 212 is connected to the output may be advantageous, for example to reduce the effective noise of these supplies in normal operation.

Since the transition between states is gradual, the timing and accuracy of the trigger event is relaxed, to the point of not requiring prediction of the trigger event prior to the next zero crossing, thus not requiring knowledge of the ring frequency.

Further, a "break before make" transition approach when switching the output between power-ringing and battery supplies can be followed when the transitions are applied gradually. A "break before make" approach can be used that will not cause abrupt discontinuities in the output current, which would in turn cause voltage transients capable of disrupting data signals. It is not necessary that at least one switch be very low impedance in order to maintain a constant, noise free, output voltage while the other switch opens or closes abruptly. Thus, there is little or no period of time where current flows between the power-ringing and battery supplies, allowing the ring switch and battery switch to be smaller. Alternately, a "make before break" transition approach with very little overlap can be applied with similar results, as will be appreciated by a person skilled in the art.

Yet further, as the transition is applied gradually, for example half the power-ring cycle as compared to ½₀th of the ring cycle in the prior art, the current required to initially drive the load is integrated over a longer period. Therefore the currents are not as large, once again allowing smaller switches, and reducing the amount of noise introduced during the transitions. When the ringing is removed gradually, the residual ringing currents in the load decay more slowly into known current paths to the power-ringing and battery supplies, as opposed to prior art where due to the use of a fast transition these currents had to be conducted rapidly with low impedance large switches to handle the large currents and limit the resulting noise, and additionally require "make before break" to ensure a current path is maintained to ensure further noise is not generated.

Embodiments of the present invention provide several advantages and potential advantages over the prior art. Primarily, the ringing controller 200 described herein reduces the high frequency noise that falls into a data band, that is higher in frequency than a voice band, during transitions between the battery state and the power-ringing state.

A further advantage of the present invention is the absence of a requirement for prediction of a trigger event, for example a point in time prior to the next zero crossing of the battery supply 214 and the power-ringing supply 212, which would require knowledge or estimation of the ring frequency. Thus, the ringing controller 200 can properly operate independent of the ringing frequency.

Yet further, due to the gradual application of the transitions between battery and ringing states, the requirement for timing accuracy of the trigger events is reduced, which simplifies the implementation.

Yet further, due to the gradual application of the transitions between battery and ringing states, power-ringing and battery supplies can be applied and removed from the output without excessive currents flowing to and from battery, allowing smaller switches to be used and less noise to be generated.

Yet further, embodiments of the present invention provide the option of applying the transitions using a "break-before-make" process, wherein a connection to one of either the battery or ringing supplies is severed before a connection to the other of the supplies is made. This avoids a period of time where current conducts between the battery and power-ringing supplies, allowing the use of smaller switches.

Yet further, embodiments of the present invention allow the use of smaller switches, which allows integration of the invention into a single integrated circuit, resulting in lower cost, and improved reliability.

Yet further, embodiments of the present invention allow the continuous application of a feedback network 208, which reduces the high frequency noise of either the battery supply 214 or power-ringing supply 212, whichever is currently connected to the output, effectively acting as a battery filter or power-ringing supply filter.

Additionally, embodiments of the present invention may provide additional benefits by limiting and/or eliminating high currents in the ring controller 200, thus reducing the capacity, complexity, and noise requirements of the battery supply 214 and power-ringing supply 212 that are connected to the ringing controller 200.

Although the invention has been described with reference to certain specific embodiments, various modifications thereof will be apparent to those skilled in the art without departing from the spirit and scope of the invention as outlined in the claims appended hereto.

What is claimed is:

1. A switching device for selectively applying one of two different voltage supplies to a common node, a first of said voltage supplies being coupled to said common node by a first switch and a second of said voltage supplies being coupled to said common node by a second switch, said switching device comprising:
   (a) a feedback network comprising a high-pass filter that filters a signal at said common node and that outputs said signal having been high-pass filtered as a feedback signal;
   (b) a timing controller coupled to at least one of said first and second voltage supplies, that determines when to switch between said first and second voltage supplies;
   (c) a ring switch controller that applies a first control signal to said first switch for selectively enabling and disabling said first switch in response to said timing controller and said feedback signal; and
   (d) a battery switch controller that applies a second control signal to said second switch for selective enabling and disabling said second switch in response to said timing controller and said feedback signal.

2. A switching device as defined in claim 1, wherein said first voltage supply is an alternating current (AC) voltage supply and said second voltage supply is a direct current (DC) voltage supply.

3. A switching device as defined in claim 2, wherein said timing controller is coupled to said AC voltage supply.

4. A switching device as defined in claim 3, wherein said timing controller is further coupled to said DC voltage supply and said common node.

5. A switching device as defined in claim 3, wherein said first switch comprises two serially coupled transistors.

6. A switching device as defined in claim 3, wherein said second switch comprises two serially coupled transistors.

7. A method of selectively switching between two different voltage supplies supplying a common node, a first of said voltage supplies being coupled to said common node by a first switch and a second of said voltage supplies being coupled to said common node by a second switch, said method comprising the steps of:
   (a) receiving a request to switch between said first and second voltage supplies;
   (b) gradually removing one of said voltage supplies coupled to said common node;
   (c) gradually applying an other of said voltage supplies; and
   (d) filtering a signal at said common node for detecting noise.

8. A method of selectively switching between two different voltage supplies supplying a common node, a first of said voltage supplies being coupled to said common node by a first switch and a second of said voltage supplies being coupled to said common node by a second switch, said method comprising the steps of:
   (a) receiving a request to switch between said first and second voltage supplies;
   (b) gradually removing one of said voltage supplies coupled to said common node;
   (c) gradually applying an other of said voltage supplies;
   (d) filtering a signal at said common node for detecting noise; and
   adjusting a rate of at least one of said step (b) and said step (c) in response to said signal being filtered, for reducing said noise being detected.

9. A method as defined in claim 8, wherein said first and second voltage supplies are gradually applied and removed over a period of one half of a ring cycle.

10. A method as defined in claim 8, wherein said step of gradually applying said other of said voltage supplies does not begin until said step of gradually removing said one of said voltage supplies is complete.

11. A method as defined in claim 10, wherein said step of gradually removing said one of said voltage supplies is complete when a predefined target is achieved.

12. A method as defined in claim 11, wherein said predefined target corresponds to a complete removal of said one of said voltage supplies.

13. A method as defined in claim 10, wherein said first voltage supply is an alternating current (AC) voltage supply and said second voltage supply is a direct current (DC) voltage supply.

14. A method as defined in claim 13, wherein said step of gradually removing said one of said voltage supplies comprises gradually turning off one of said first and second switches that is associated therewith.

15. A method as defined in claim 13, wherein said step of gradually applying said one of said voltage supplies comprises gradually turning on one of said first and second switches that is associated therewith.

16. A method as defined in claim 13, wherein a feedback network for filtering said signal is enabled for switching to said AC voltage supply and disabled after switching to said DC voltage supply.

17. A method as defined in claim 13, wherein a feedback signal is used for adjusting a rate at which said AC voltage supply is applied and removed from said common node.

18. A method as defined in claim 8, further comprising the step of:

gradually disabling a filter used for said step of filtering.

19. A method as defined in claim 18, wherein said filter is gradually disabled after switching from an AC voltage supply to a DC voltage supply and back.

20. A method as defined in claim 18, wherein said filter is gradually disabled after each switch between said first and second voltage supplies.

* * * * *